United States Patent
Latif et al.

(10) Patent No.: US 11,748,588 B1
(45) Date of Patent: Sep. 5, 2023

(54) AUTOMATED SECURE PAPER TRAY ACCESS AND PAPER QUOTA MANAGEMENT SYSTEM FOR PUBLIC PRINTERS

(71) Applicant: Prince Mohammad Bin Fahd University, Dhahran (SA)

(72) Inventors: Ghazanfar Latif, Dhahran (SA); Ghassen Ben Brahim, Dhahran (SA)

(73) Assignee: Prince Mohammad Bin Faisal University, Dhahran (SA)

( * ) Notice: Subject to any disclaimer, the term of this patent is extended or adjusted under 35 U.S.C. 154(b) by 0 days.

(21) Appl. No.: 18/163,047

(22) Filed: Feb. 1, 2023

(51) Int. Cl.
*G06F 21/32* (2013.01)
*G06K 15/00* (2006.01)
*G06F 21/62* (2013.01)
*G06F 21/12* (2013.01)

(52) U.S. Cl.
CPC ....... *G06K 15/4065* (2013.01); *G06F 21/123* (2013.01); *G06F 21/32* (2013.01); *G06F 21/6209* (2013.01); *G06K 15/005* (2013.01)

(58) Field of Classification Search
CPC ........... G06K 15/4025; G06K 15/4065; G06K 15/005; G06F 21/123; G06F 21/6209; G06F 21/32
See application file for complete search history.

(56) References Cited

U.S. PATENT DOCUMENTS

| | | |
|---|---|---|
| 2012/0120451 A1 | 5/2012 | Ikegami et al. |
| 2016/0246550 A1* | 8/2016 | Taki ................. G06K 15/005 |
| 2016/0381235 A1 | 12/2016 | Koda |
| 2017/0078508 A1* | 3/2017 | Amico ............... H04N 1/3263 |
| 2020/0089449 A1 | 3/2020 | Kamada |

* cited by examiner

*Primary Examiner* — Thaddeus J Plecha
(74) *Attorney, Agent, or Firm* — Oblon, McClelland, Maier & Neustadt, L.L.P.

(57) ABSTRACT

A paper tray access system for a printer includes a locking cover of paper tray, an authentication device, a weight sensor located beneath the paper tray, a printer display, a computing device including electrical circuitry, a memory storing program instructions and at least one processor. The computing device is configured to receive user input from the authentication device and determine whether the user input matches the authentication record. When user input matches authentication record, the computing device presents a selection on printer display to access a paper tray, receives the selection, records a first weight of the paper tray upon receiving the selection, unlocks the locking cover, records a second weight of the paper tray, calculates an amount of papers removed from paper tray when second weight is less than first weight, and calculates an amount of papers added to paper tray when second weight is greater than first weight.

20 Claims, 11 Drawing Sheets

AUTOMATED SECURE PAPER TRAY ACCESS AND PAPER QUOTA MANAGEMENT SYSTEM FOR PUBLIC PRINTERS

BACKGROUND

Technical Field

The present disclosure is directed to a system and a method for automated secure paper tray access. The present disclosure is also related to a system and a method for paper quota management for public printers.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Currently, many companies and educational institutions, such as colleges, universities, schools, hospitals, banks, and businesses deploy printers that may be shared between a large number of users. To monitor and control printing access of a printer, biometric or identity-based solutions are being integrated as a part of the printer. However, the existing printing access process fails to control access to the paper tray of the printer which is currently publicly accessible. As a result, any user who can physically access the printer can reach into the paper tray and take out as many papers as he or she needs. This may jeopardize the printing process for other users and may eventually hinder the main purpose of the printer. This problem may be aggravated in educational institutions where users (for example, students) may take scratch papers from paper trays of printers. To address this problem, some educational institutions have considered a solution which includes deploying a regular custom-made metal lock to secure a paper tray. The regular custom-made metal lock does not appear professional and requires that an employee carry a key and be available to open the metal lock as needed. In addition, a key to the custom-made metal lock may be kept only with one person who may be responsible for keeping track of papers added and/or removed from the paper tray. This approach may not be convenient when the printer needs to be fed with more papers and the responsible person is not available. This may cause significant delay and inconvenience, specifically when printouts are time critical.

Accordingly, it is one object of the present disclosure to provide methods and systems that address secure access to printer trays.

SUMMARY

In an exemplary embodiment, a paper tray access system for a printer is disclosed. The paper tray access system includes a locking cover of a paper tray, an authentication device, a weight sensor located beneath the paper tray, a printer display, and a computing device including an electrical circuitry, a memory storing program instructions and at least one processor. The at least one processor is configured to execute the program instructions to receive a user input from the authentication device and determine whether the user input matches an authentication record stored in the memory. When the user input matches the authentication record, the computing device is configured to present a selection on the printer display to access the paper tray, receive the selection, record a first weight of the paper tray upon receiving the selection, unlock the locking cover, record a second weight of the paper tray, calculate an amount of papers removed from the paper tray when the second weight is less than the first weight, and calculate an amount of papers added to the paper tray when the second weight is greater than the first weight.

In another exemplary embodiment, a method for paper tray access of a printer is disclosed. The method includes prompting, on a display of the printer, a user to enter an authentication input, and receiving, by a computing device of the printer, the authentication input. The method further includes determining, by the computing device, whether the authentication input matches an authentication record, and when the authentication input matches the authentication record, presenting, on the display, a selection to access a paper tray. The method also includes measuring, by a weight sensor located beneath the paper tray, a first weight of the paper tray upon receiving the selection, and recording, by the computing device, the first weight. The method further includes unlocking, by the computing device, a locking cover of the paper tray of the printer, and measuring, by the weight sensor, a second weight of the paper tray. The method further includes recording, by the computing device, the second weight. Also, the method includes, calculating, by the computing device, an amount of papers removed from the paper tray when the second weight is less than the first weight, and calculating, by the computing device, an amount of papers added to the paper tray when the second weight is greater than the first weight.

In yet another exemplary embodiment, a method for monitoring paper tray access of a plurality of networked printers is disclosed. The method includes receiving, by a cloud server including a web application for managing the plurality of networked printers, a request to perform a print job from a user computer. The method further includes selecting a designated printer from the plurality of networked printers by matching the print job to one of the plurality of networked printers based on proximity of the each of the plurality of networked printers to the user computer and a number of papers stored in each paper tray of each of the plurality of networked printers. Also, the method includes transmitting an authentication input and a location of the designated printer to the user computer, and prompting, by the designated printer, a user of the user computer to enter the authentication input. Further, the method includes receiving, by the cloud server, the authentication input from the designated printer, accessing, by the cloud server, a database including a list of authentication records, and determining, by the cloud server, whether the authentication input matches one of the authentication records. The method further includes, when the authentication input matches one of the authentication records, presenting, on a display of the designated printer, a selection to access a paper tray, and measuring, by a weight sensor located beneath the paper tray of the designated printer, a first weight of the paper tray upon receiving the selection. Further, the method includes recording, by a computing device of the designated printer, the first weight, and unlocking, by the computing device, a locking cover of the paper tray of the designated printer. The method includes measuring, by the weight sensor, a second weight of the paper tray, and recording, by the computing device, the second weight. Further, the method includes calculating, by the computing device, an amount of papers removed from the paper tray when the second weight is less than the first weight, and calculating, by the computing device, an amount of papers added to the paper tray when the second weight is greater than the first weight.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
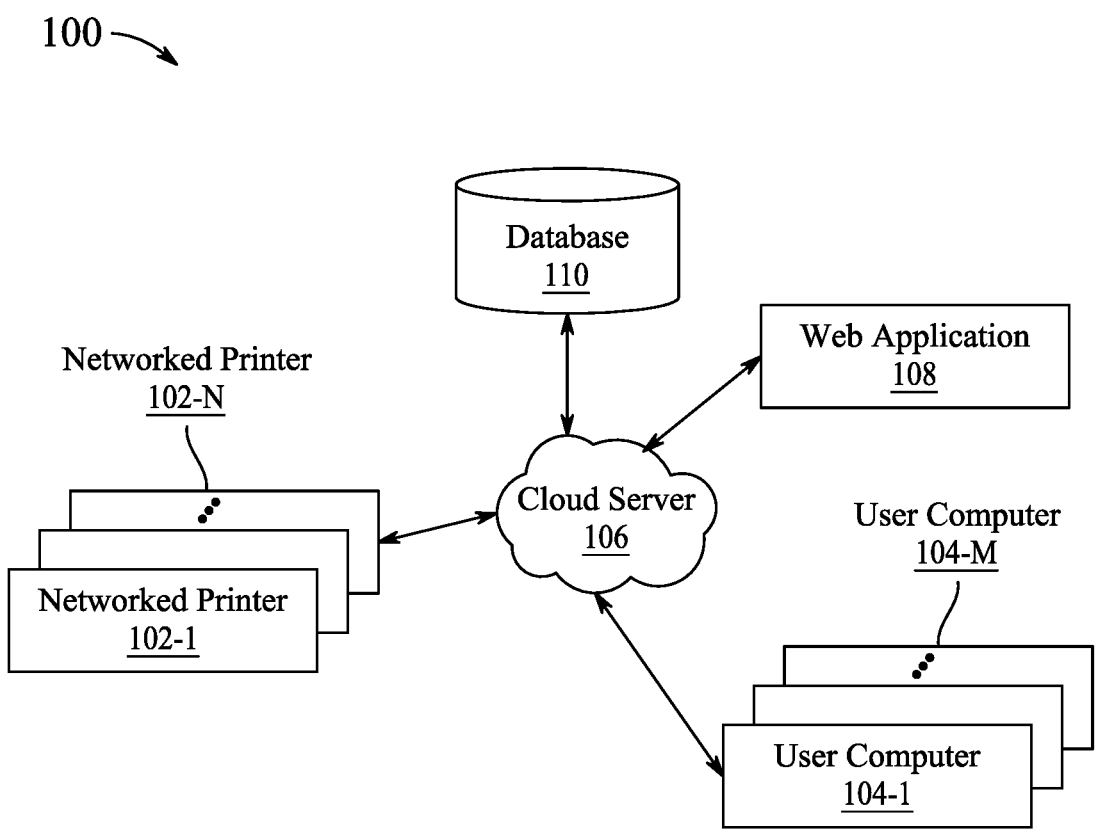
FIG. 1A illustrates a block diagram of a paper tray access system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for automated secure paper tray access. Aspects of this disclosure are further directed to a system and a method for paper quota management for public printers. According to the disclosure, the access to paper trays is only granted when users are identified and authenticated. When the users are authenticated, the paper trays may be unlocked for use by the users. In examples, the users may remove blank papers from the paper trays after gaining access to the paper trays. In an example, the removal of blank papers from a paper tray may be monitored through a scaling-based mechanism. According to the mechanism, a scale device may be integrated along with the paper tray to keep track of the difference in the weight of the paper tray before and after unlocking the paper tray.

FIG. 1A illustrates a block diagram of a paper tray access system 100, according to certain embodiments.

In an aspect of the present disclosure, the paper tray access system 100 may be deployed in an organization. As shown in FIG. 1A, the paper tray access system 100 may include a plurality of networked printers 102-(1-N), a plurality of user computers 104-(1-M), a cloud server 106, a web application 108, and a database 110. The plurality of networked printers 102-(1-N) may be available on an organization network. In examples, the organization network may be on a public network (for example, a secured public network), a private network, or a private cloud. Depending on the organization size and network setup, the plurality of networked printers 102-(1-N) may be connected with the public network, the private network, or the private cloud having shared active directory for paper tray access management. In aspects of the present disclosure, the plurality of networked printers 102-(1-N) may be connected to the same network or cloud and have active directory of users in the organization who are authenticated to use at least one of the plurality of networked printer 102-(1-N). In an example, the users may be employees of the organization, partners of the organization, clients, vendors, customers, contractors, or anyone associated with the organization. Each of the plurality of networked printers 102-(1-N) may be configured to access the web application 108, where each networked printer is configured to calculate a number of papers (or blank papers) in each paper tray and transmit the number of papers in each paper tray to the database 110 for storage purposes. Examples by which a number of blank papers in a paper tray is calculated are described in detail later in the disclosure.

Referring again to FIG. 1A, in one or more embodiments, the user computers 104-(1-M) may be any device used by a user. The user computers 104-(1-M) are subsequently referred to as user computer 104-1, but the description may be generalized to any of the user computers 104-(1-M). According to an aspect, the user computer 104-1 may be any device used by a user. The user computer 104-1 may be any computing device, such as a desktop computer, a laptop, a tablet computer, a mobile device, a Personal Digital Assistant (PDA), or any other computing device. In an aspect of the present disclosure, the user computer 104-1 may be configured to submit print jobs to one or more of the plurality of networked printers 102-(1-N). Other user computers 104-(2-M) may be similar to the user computer 104-1.

According to aspects of the present disclosure, the cloud server 106 may be configured to communicate with the user computer 104-1 to receive user inputs (for example, printing requests). Further, the web application 108 may be operatively connected to the cloud server 106. The web application 108 may be configured to manage the plurality of networked printers 102-(1-N). In aspects, the web application 108 may be configured to monitor paper tray access. In an aspect, the database 110 may be stored in the cloud server 106. In examples, the database 110 may include a list of authentication records associated with the users of the organization. In some examples, the authentication records may include information associated with the users, such as usernames, employee IDs, job departments of the users, and the like. Further, the database 110 may include a blank paper usage limit associated with a user of the user computer 104-1. In an example, the blank paper usage limit may include a total number of papers the user may remove from the paper trays of any of the plurality of networked printers 102-(1-N). The list of authentication records and the blank paper usage limit stored in the database 110 may be periodically or dynamically updated as required by policies of the organization.

The cloud server 106 may be configured to communicate with the user computer 104-1 to receive a user input from the authentication device 118. In an example, the user input may include biometrics of the user, a magnetic card scan, a login code, and so forth. The cloud server 106 may access the database 110 to match the user input to an authentication record from amongst the list of authentication records.

Figure 1B:
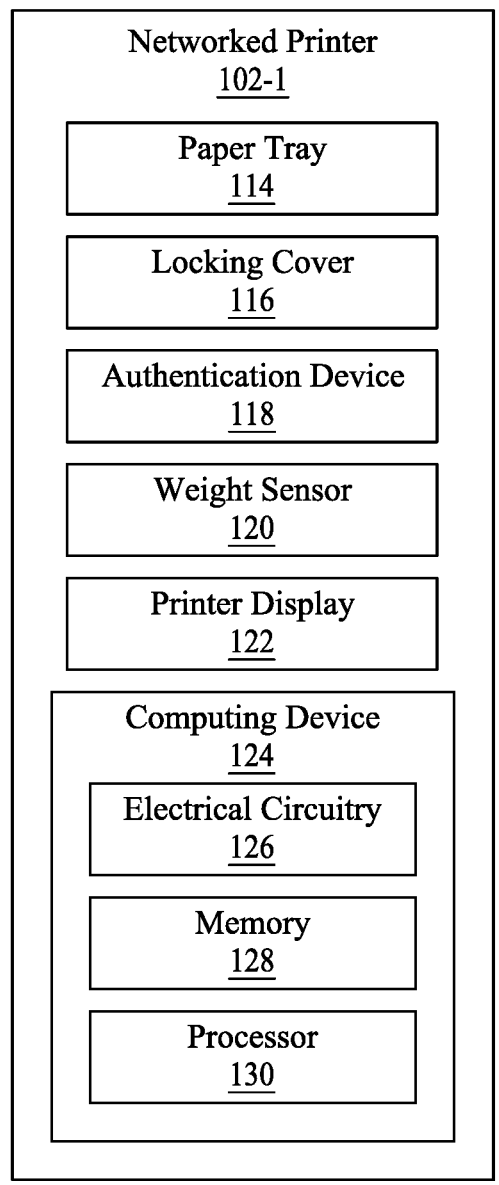
FIG. 1B illustrates a block diagram of a networked printer, according to certain embodiments.

FIG. 1B illustrates a block diagram of a representative networked printer 102-1, according to certain embodiments.

As described in FIG. 1B, the networked printer 102-1 includes a paper tray 114 (also referred to as printer tray 114), a locking cover 116 of the paper tray 114, an authentication device 118, a weight sensor 120, a printer display 122, and a computing device 124. The computing device 124 includes electrical circuitry 126, a memory 128, and at least one processor 130. The networked printer 102-1 may interchangeably be referred to as printer 102-1.

In an aspect, the paper tray 114 may be configured to store and feed paper to the networked printer 102-1. Although, one paper tray 114 is shown in FIG. 1B, the networked printer 102-1 may include multiple paper trays. Further, the locking cover 116 may be configured to cover the paper tray 114. The locking cover 116 may be configured with an electronic bolt lock. The computing device 124 may be configured to generate a drive signal to operate the electronic bolt lock. The computing device 124 may generate the drive signal to one of unlock and lock the electronic bolt lock of the locking cover 116 of the paper tray 114.

In an aspect, the authentication device 118 may be any one or more of a biometric reader, a magnetic card (also referred to as a magnetic card reader), or a keypad. The keypad may be configured to receive a login code. According to an aspect, the weight sensor 120 may be a scale device. The weight sensor 120 may be a high precision resistance weight-based sensor. In an example, the weight sensor 120 may be a Mettler Toledo 10 Kg scale weight sensor (manufactured by Mettler-Toledo, LLC, 1900 Polaris Parkway, Columbus, Ohio 43240, USA). The weight sensor 120 may be located beneath the paper tray 114. In an aspect, the weight sensor 120 may be centered on an underside of the paper tray 114. In an aspect, a wiring harness may be operatively connected to the weight sensor 120 and to the computing device 124. The weight sensor 120 may be configured to measure a weight of the paper tray 114 when papers are added to the paper tray 114 and/or removed from the paper tray 114. In an example, the weight sensor 120 may keep track of the difference in the weight of the paper tray 114 before and after unlocking the paper tray 114 by a user.

According to an aspect of the present disclosure, the printer display 122 may be located on the networked printer 102-1. The printer display 122 may be configured to show a menu of printer tasks. The printer tasks include, but are not limited to, photocopy, scan and send, secure print, and access paper tray.

In an aspect, the computing device 124 may be configured to manage and control printer operations. The memory 128 may be coupled to the processor 130 and may include any computer-readable medium known in the art including, for example, volatile memory, such as static random access memory (SRAM) and dynamic random access memory (DRAM) and/or nonvolatile memory, such as read-only memory (ROM), erasable programmable ROM, flash memories, hard disks, optical disks, and magnetic tapes. The memory 128 may be capable of storing data and allowing any storage location to be directly accessed. In examples, the memory 128 may include a list of authentication records associated with users and a blank paper usage limit associated with a user of the user computer 104-1. The blank paper usage limit includes a total number of papers the user of the user computer 104-1 may remove from the paper tray 114. The list of authentication records and the blank paper usage limit stored in the memory 128 may be periodically or dynamically updated as required.

According to an aspect of the present disclosure, the processor 130 may be implemented as one or more microprocessors, microcomputers, microcontrollers, digital signal processors, central processing units, state machines, logic circuitries, and/or any devices that manipulate signals based on operational instructions. Among other capabilities, the processor 130 may be configured to fetch and execute computer-readable instructions stored in the memory 128.

Figure 2:
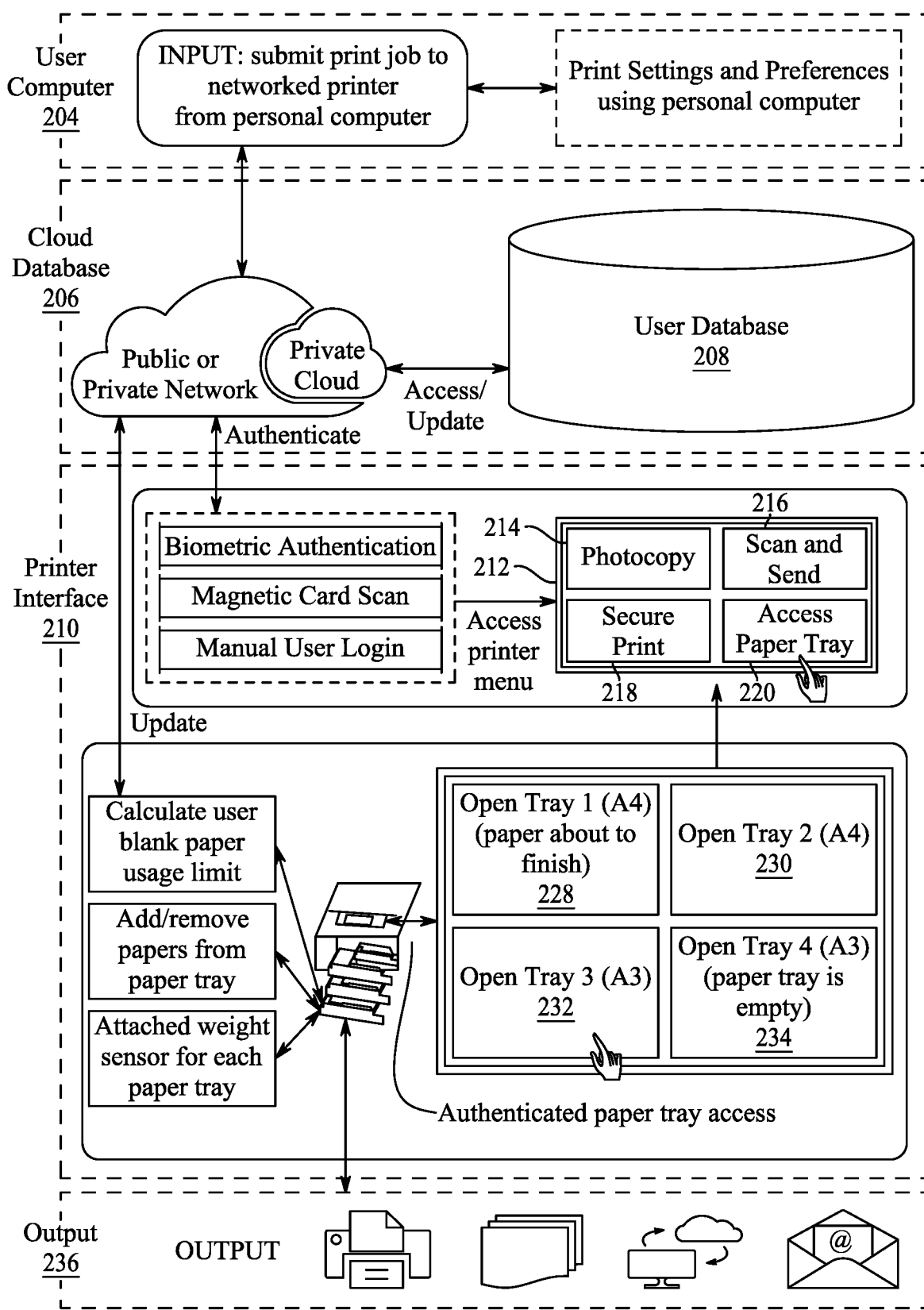
FIG. 2 describes an example process of monitoring paper tray access of a plurality of networked printers, according to certain embodiments.

FIG. 2 describes an exemplary process 200 of monitoring paper tray access of the plurality of networked printers 102-(1-N).

According to an aspect of the present disclosure, a user of a user computer 204 may submit a request to perform a print job from the user computer 204. The user computer 204 may be an example of the user computer 104-1. The cloud server 106 may receive the request to perform the print job. In examples, the web application 108 may be configured to receive the print job from the user computer 204.

In an aspect, the web application 108 may be configured to match the print job to one of the plurality of networked printers 102-(1-N) based on the proximity of each of the plurality of networked printers 102-(1-N) to the user computer 104-1 and a number of papers stored in each paper tray of each of the plurality of networked printers 102-(1-N). The web application 108 may access user database 208 to determine the number of papers stored in each paper tray of each of the plurality of networked printers 102-(1-N). The user database 208 may be an example of database 110. In examples, the user database 208 may include information related to allowed authentication methods, permissions management, employee (user) basic information, personalized printer properties, printer usage log, and printer paper limit. The cloud server 106 may be configured to provide a networked printer location to the user computer 104-1.

The web application 108 may select a designated printer from amongst the plurality of networked printers 102-(1-N) based on matching the print job to one of the plurality of networked printers 102-(1-N). In an aspect, the designated printer may be the networked printer 102-1. In an aspect, the plurality of networked printers 102-(1-N) may be scanned to identify an optimum printer to send the print job to in terms of shorter queue size (as it may lead to less waiting time), existence of the required number of blank papers needed to print the entire print job, and physical location. For ease of explanation and understanding, the description provided below is with reference to the networked printer 102-1, however, the description is equally applicable to any of the remaining networked printers 102-(2-N).

In an aspect, the cloud server 106 may transmit a user input and a location of the designated printer (hereinafter referred to as networked printer 102-1) to the user computer 104-1. In an example, the user input may include login information, such as username and password. In some examples, the user input may be a login code. In examples, once the print job is submitted, the user may have to physically go to the networked printer 102-1 and access the networked printer 102-1 through the authentication device 118. As described earlier, the authentication device 118 may be a biometric reader, a magnetic card (or a magnetic card reader), or a keypad.

In an aspect, the networked printer 102-1 may prompt the user of the user computer 104-1 to enter the user input. A prompt for the user to enter the user input may be presented on the printer display of the networked printer 102-1. In FIG. 2, a printer interface 210 and a printer display 212 are shown. The printer display 212 is an example of the printer display 122. The user input may be entered at any one of the biometric reader, the magnetic card reader, and the keypad. For example, the user may manually input the user input (for example, the login code) via the keypad.

The computing device 124 receives the user input from the authentication device 118. The computing device 124 may access the memory 128 that stores the list of authentication records. The computing device 124 may then determine whether the user input matches an authentication record stored in the memory 128. When the user input matches the authentication record, then the user is authenticated. Once authenticated, the user may gain access to the printer menu as well as printer resources such as the paper tray 114. In an example, initially the paper tray 114 may be locked or in a locked state. However, the user can open or access the paper tray 114 using the printer menu if the user is authorized to do so.

In an aspect, when the user input matches the authentication record, the computing device 124 may present a selection on the printer display to access the paper tray 114. In an example, the printer display may be configured to show a menu (also referred to as printer menu) of printer tasks when the user input matches the authentication record, where the menu may include a selection for paper tray access. The selection of the paper tray unlocks the electronic bolt lock.

As shown in FIG. 2, the printer menu shows a "photocopy" icon 214, a "scan and send" icon 216, a "secure print" icon 218, and an "access paper tray" icon 218. The user may select the "access paper tray" icon 220 by clicking on the "access paper tray" icon 220. The printer menu may be any one of a touchscreen, may include physical buttons beneath each selection, or may receive inputs from a mouse device. In an aspect, when the user selects the "access paper tray" icon 220, the user may be provided with a second printer menu to select a paper tray from amongst the available paper trays on the networked printer 102-1. The printer menu may include a first printer menu showing the selection choices for operating the printer and a second printer menu may show the current status of each of the paper trays. For example, the second printer menu may describe the information about the number of existing blank papers in each paper tray. As shown in FIG. 2, the second printer menu shows a "open tray 1 (A4)" icon 228, a "open tray 2 (A4)" icon 230, a "open tray 3 (A3)" icon 232, and a "open tray 4 (A3)" icon 234. In the example shown in FIG. 2, status of tray 1 is "papers about to finish" and status of tray 4 is "paper tray is empty". In examples, the user may select the "open tray 3 (A3)" icon 232, for example, using a touch screen or a mouse pointer. In an example, tray 3 may be the paper tray 114.

In an aspect, the computing device 124 may receive the selection. Further, the weight sensor 120 located beneath the paper tray 114 may measure a first weight of the paper tray 114 upon receiving the selection. The computing device 124 may record the first weight of the paper tray 114. Alternatively, the computing device 124 may source the first weight of the paper tray 114 from a previously recorded weight in the database.

The number of existing blank papers in a paper tray may be calculated and accurately extrapolated using a weight sensor attached to that paper tray. In an example, the weight sensor may be connected to the printer circuit where the reported tray weight may be converted in a number of blank paper using Equation (1) provided below.

$$\#\text{blank\_paper} = \frac{TrayWeight}{SingleBlankPaperWeight}, \quad (1)$$

where, TrayWeight represents the current weight of the paper and SingleBlankPaperWeight may represent a fixed number which corresponds to the known weight of a single blank paper. In an example, the weight of an A4 size paper is 6.23 grams.

In an aspect, subsequent to recording the first weight of the paper tray 114, the computing device 124 may be configured to unlock the locking cover 116 of the paper tray 114 of the networked printer 102-1. In an example, upon user authentication, the electronic bolt lock may be deactivated by interrupting the electricity supply and the paper tray 114 becomes unlocked. In an aspect, the computing device 124 may generate a drive signal configured to unlock the electronic bolt lock of the locking cover 116 of the paper tray 114 when the user input matches the authentication record.

In an aspect, when the paper tray 114 is unlocked, the user may access the paper tray 114 and remove one or more blank papers. The weight sensor 120 may measure a second weight of the paper tray 114. The computing device 124 may record the second weight of the paper tray 114. In an aspect, the computing device 124 may calculate the amount of papers removed from the paper tray 114 when the second weight is less than the first weight. Further, the computing device 124 may calculate the amount of papers added to the paper tray 114 when the second weight is greater than the first weight.

In examples, in the event that the user reaches the paper tray 114 to collect blank papers (or remove blank papers), the computing device 124 may calculate the number of collected (or removed) blank papers using Equation (2) provided below.

$$\#\text{blank\_paper\_used} = \frac{TrayWeight_{beforeUnlock} - TrayWeight_{afterUnlock}}{SingleBlankPaperWeight}. \quad (2)$$

$TrayWeight_{beforeUnlock}$ corresponds to the first weight of the paper tray 114 and $TrayWeight_{afterUnlock}$ corresponds to the second weight of the paper tray 114.

In an aspect, the computing device 124 may compare a blank paper usage limit associated with the user to the amount of papers removed from the paper tray 114. When the amount of papers removed from the paper tray 114 exceeds the blank paper usage limit, the computing device 124 may lock the locking cover 116, and the user will not be authorized to gain access to the paper tray 114. After locking the locking cover 116, the computing device 124 may perform one or more of displaying a warning on the printer display 122, transmitting an alert (for example, as an output 236 shown in FIG. 2) to the user computer 104-1 that the blank paper usage limit has been exceeded, and charging the user for the blank papers which exceed the usage limit.

According to some aspects of the present disclosure, the computing device 124 may transmit the amount of papers added or removed from the paper tray 114 to the cloud server 106. The cloud server 106 may update a blank paper usage limit associated with the user, where the blank paper user limit is stored in the database 110.

Figure 3:
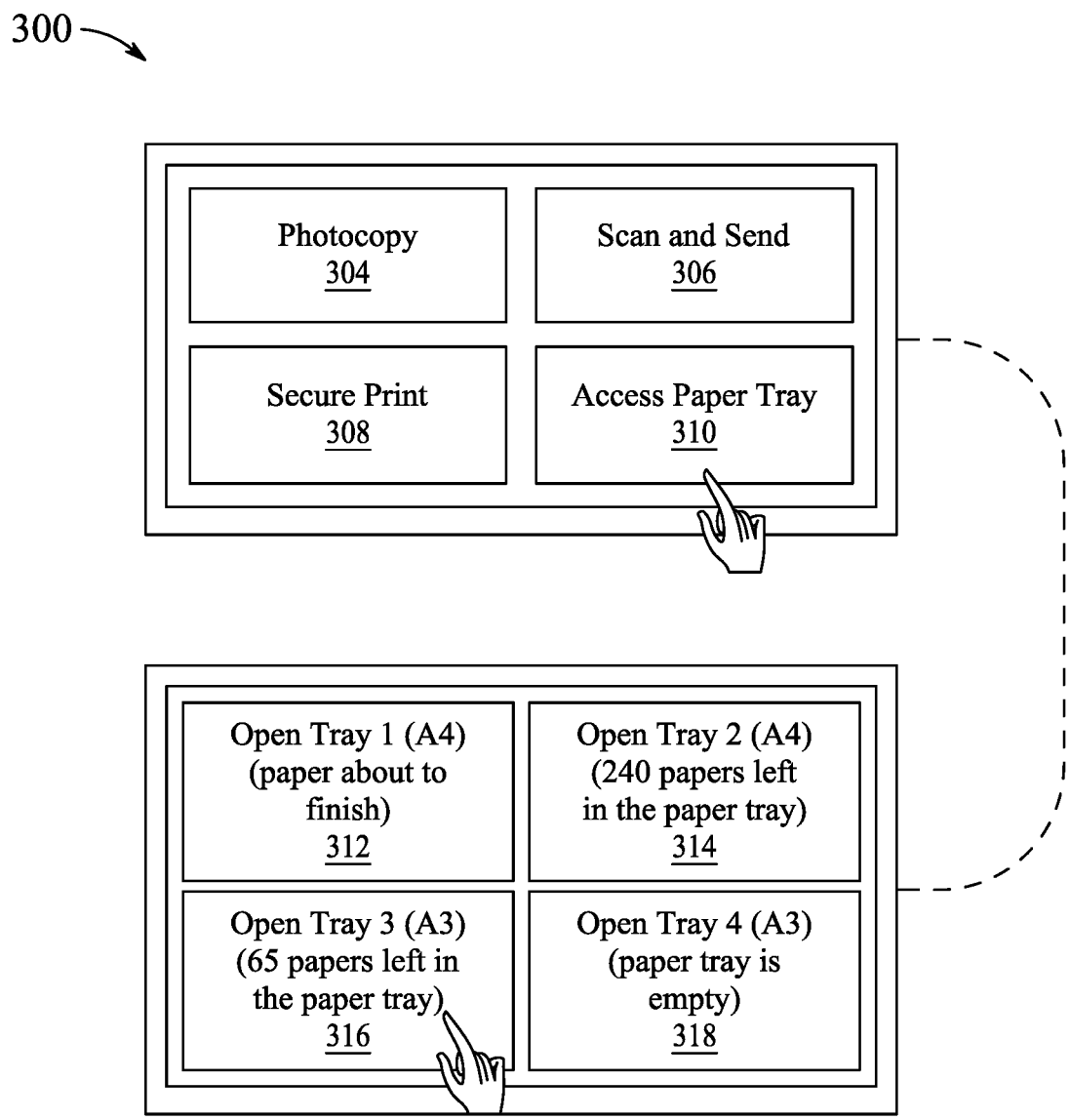
FIG. 3 illustrates a printer menu of a networked printer, according to certain embodiments.

FIG. 3 illustrates a printer menu 300 of a printer, according to certain embodiments.

According to an aspect, information about existing blank papers in paper trays may be updated based on the amount of papers added or removed by a user and can be displayed on the printer menu 300. In the example shown in FIG. 3, the printer menu 300 shows a "photocopy" icon 304, a "scan and send" icon 306, a "secure print" icon 308, and an "access paper tray" icon 310. When the user selects the "access paper tray" icon 310 by clicking on the "access paper tray" icon 310, the user may access paper tray information in terms of blank paper count in each of the paper trays which is calculated by converting the reported paper tray weight into a number of available blank papers using Equations (1) and (2).

As shown in FIG. 3, the printer menu 300 shows an "open tray 1 (A4)" icon 312, an "open tray 2 (A4)" icon 314, an "open tray 3 (A3)" icon 316, and an "open tray 4 (A3)" icon 318. In the example shown in FIG. 3, status of tray 1 is "papers about to finish", status of tray 2 is "240 papers left in the paper tray", status of tray 3 is "65 papers left in the paper tray" and status of tray 4 is "paper tray is empty".

Figure 4:
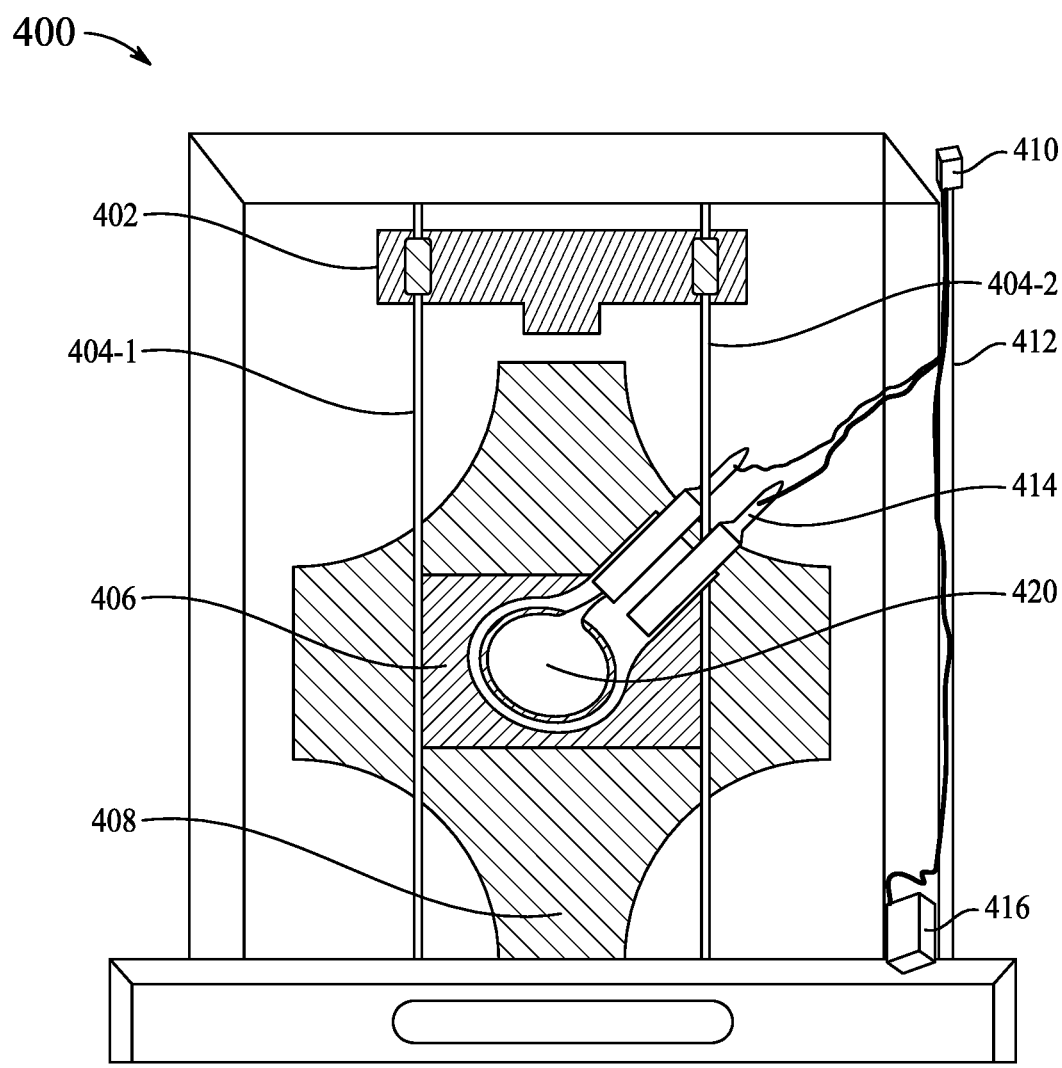
FIG. 4 illustrates a paper tray of a networked printer, according to certain embodiments.

FIG. 4 illustrates a paper tray 400 of a printer.

The paper tray 400 be an example of the paper tray 114, and the printer may be an example of the networked printer 102-1. The paper tray 400 includes a weight sensor 420. The weight sensor 420 is an example of the weight sensor 120. In an example, the weight sensor 420 is a high precision resistance weight-based sensor. The weight sensor 420 may be located beneath the paper tray 400 and centered on an underside of the paper tray 400. In an example, the weight sensor 420 may be a Mettler-Toledo 10 Kg scale weight sensor. The paper tray 400 further includes a moveable edge 402 to fit the paper size. Further, the paper tray 400 includes two fixed rods 404-1, 404-2 to support the weight sensor 420 and the moveable edge 402. The paper tray 400 also includes a lower tray 406 to hold the weight sensor 420 and an upper cover 408 on the top of the paper tray to hold papers. Further, the paper tray 400 includes a connector 410 to connect the paper tray 400 to other printer components or circuits. The paper tray 400 also includes a protection cover 412 for electric wires. The paper tray 400 includes connection 414 of the weight sensor 420 with printer circuit/LCD. The paper tray 400 further includes an electronic bolt lock 416. As shown in FIG. 4, the electronic bolt lock 416 may be located in the right front corner of the paper tray 400, which is connected to the printer circuit through electric wires. In examples, upon user authentication, the electronic bolt lock 416 is deactivated by interrupting the electricity supply and the paper tray 400 becomes unlocked.

The present disclosure addresses the printer tray's open access problem described earlier. The availability of printing resources is significantly improved through the blank paper access control. In an aspect, the use of the printing resources is monitored for all authorized users in terms of printing and borrowing blank papers from the paper trays. As a result, fewer blank sheets may be taken by users which yields cost-saving for organizations. Further, access to paper trays is automated as compared to having metal locks. In an example, access to paper trays for refill is granted to all authorized users as compared to a conventional setup, where a single person holding the key is allowed to open and refill the paper tray. Also, the printing service time is improved. For example, the wait time that users endure during printing when using shared printers is reduced.

Figure 5:
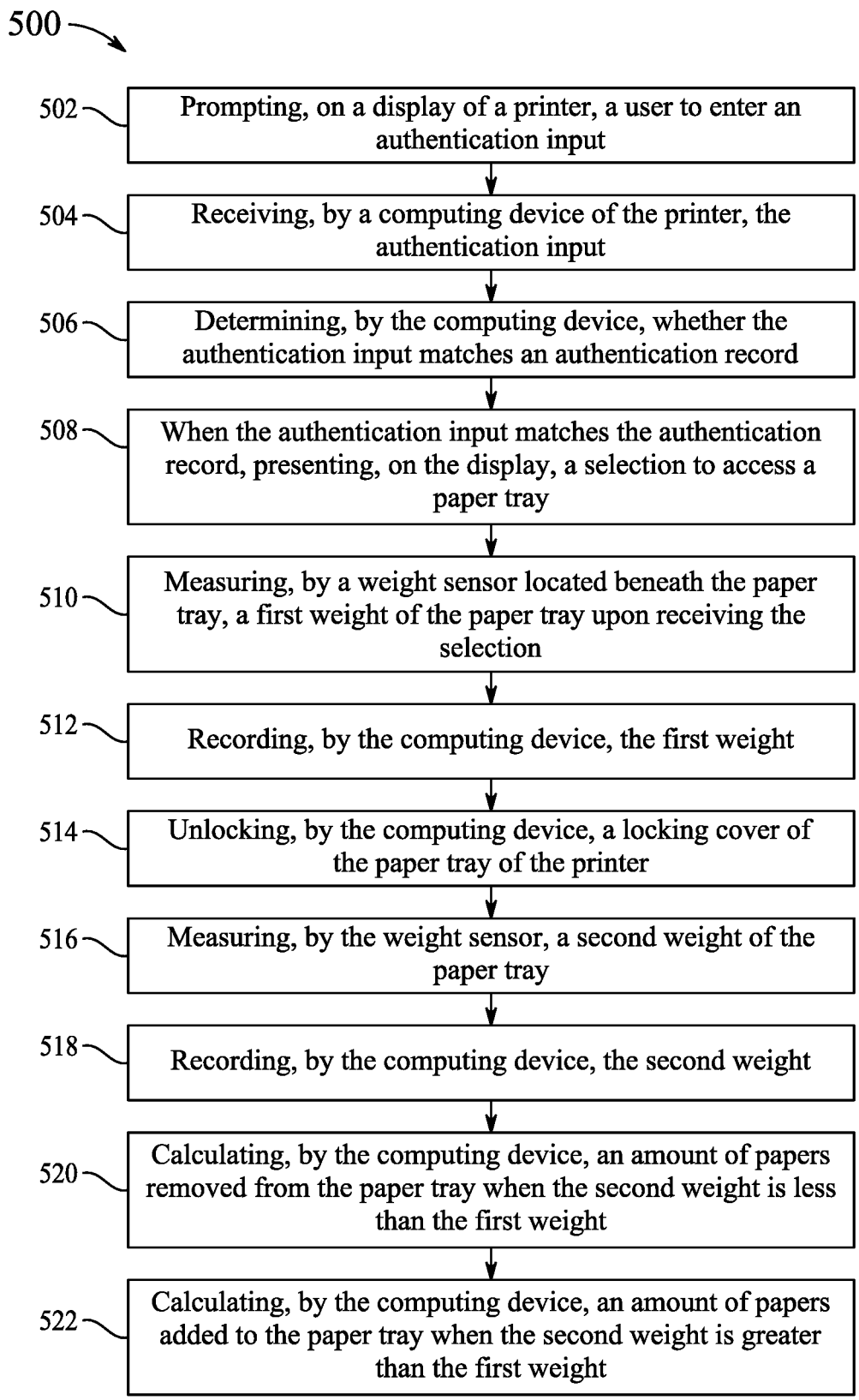
FIG. 5 is a flowchart of a method for paper tray access of a networked printer, according to certain embodiments.

FIG. 5 is a flowchart of a method 500 for paper tray access of a networked printer 102-1, according to certain embodiments.

At step 502, the method 500 includes prompting, on a display of the networked printer 102-1, a user to enter an authentication input.

At step 504, the method 500 includes receiving, by a computing device 124 of the networked printer 102-1, the authentication input. In an example, the computing device 124 may receive the authentication input from a biometric reader. In another example, the computing device 124 may receive the authentication input from a magnetic card. In yet another example, the computing device 124 may receive the authentication input from a login code entered on a keypad of the networked printer 102-1.

At step 506, the method 500 includes determining, by the computing device 124, whether the authentication input matches an authentication record.

At step 508, the method 500 includes when the authentication input matches the authentication record, presenting, on the display, a selection to access a paper tray 114.

At step 510, the method 500 includes measuring, by a weight sensor 120 located beneath the paper tray 114, a first weight of the paper tray 114 upon receiving the selection.

At step 512, the method 500 includes recording, by the computing device 124, the first weight.

At step 514, the method 500 includes unlocking, by the computing device 124, a locking cover 116 of the paper tray 114 of the networked printer 102-1.

At step 516, the method 500 includes measuring, by the weight sensor 120, a second weight of the paper tray 114.

At step 518, the method 500 includes recording, by the computing device 124, the second weight.

At step 520, the method 500 includes calculating, by the computing device 124, an amount of papers removed from the paper tray 114 when the second weight is less than the first weight.

At step 522, the method 500 includes calculating, by the computing device 124, an amount of papers added to the paper tray 114 when the second weight is greater than the first weight. The method 500 further includes comparing, by the computing device 124, a blank paper usage limit associated with the user to the amount of papers removed from the paper tray 114. When the amount of papers removed from the paper tray 114 exceeds the blank paper usage limit, the method 500 includes locking the locking cover 116, and performing one or more of displaying a warning on the display, transmitting an alert to a user computer 104-1 that the blank paper usage limit has been exceeding, and charging the user for the blank papers which exceed the usage limit. In an aspect, the computing device 124 may be configured to generate a drive signal configured to one of unlock and lock an electronic bolt lock of the locking cover 116 of the paper tray 114 of the networked printer 102-1.

Figure 6:
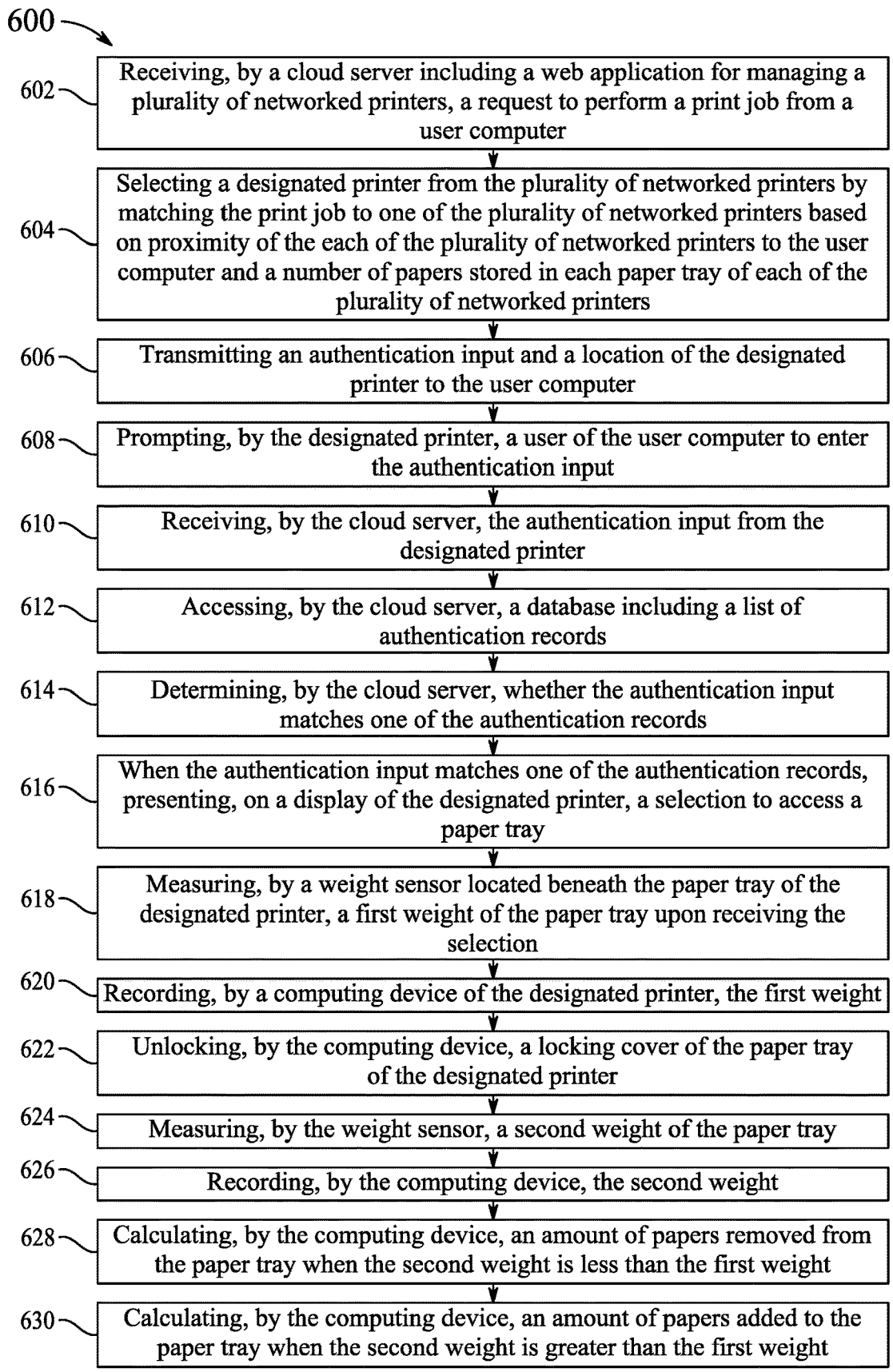
FIG. 6 is a flowchart of a method for monitoring paper tray access of a plurality of networked printers, according to certain embodiments.

FIG. 6 is a flowchart of a method 600 for monitoring paper tray access of a plurality of networked printers 102-(1-N), according to certain embodiments.

At step 602, the method 600 includes receiving, by a cloud server 106 including a web application 108 for managing the plurality of networked printers 102-(1-N), a request to perform a print job from a user computer 104-1.

At step 604, the method 600 includes selecting a designated printer from the plurality of networked printers 102-(1-N) by matching the print job to one of the plurality of networked printers 102-(1-N) based on proximity of the each of the plurality of networked printers 102-(1-N) to the user computer 104-1 and a number of papers stored in each paper tray of each of the plurality of networked printers 102-(1-N).

At step 606, the method 600 includes transmitting an authentication input and a location of the designated printer to the user computer 104-1.

At step 608, the method 600 includes prompting, by the designated printer, a user of the user computer 104-1 to enter the authentication input. In some aspects, the method 600 includes presenting on the display of the designated printer, a prompt for the user to enter the authentication input at one of a biometric reader, a magnetic card reader, and a keypad.

At step 610, the method 600 includes receiving, by the cloud server 106, the authentication input from the designated printer.

At step 612, the method 600 includes accessing, by the cloud server 106, the database 110 including a list of authentication records.

At step 614, the method 600 includes determining, by the cloud server 106, whether the authentication input matches one of the authentication records.

At step 616, the method 600 includes when the authentication input matches one of the authentication records, presenting, on a display of the designated printer, a selection to access a paper tray 114.

At step 618, the method 600 includes measuring, by a weight sensor 120 located beneath the paper tray 114 of the designated printer, a first weight of the paper tray 114 upon receiving the selection.

At step 620, the method 600 includes recording, by a computing device 124 of the designated printer, the first weight.

At step 622, the method 600 includes unlocking, by the computing device 124, a locking cover 116 of the paper tray 114 of the designated printer. In an aspect, the computing device 124 may generate a drive signal configured to one of unlock and lock an electronic bolt lock of the locking cover 116 of the paper tray 114.

At step 624, the method 600 includes measuring, by the weight sensor 120, a second weight of the paper tray 114.

At step 626, the method 600 includes recording, by the computing device 124, the second weight.

At step 628, the method 600 includes calculating, by the computing device 124, an amount of papers removed from the paper tray 114 when the second weight is less than the first weight.

At step 630, the method 600 includes calculating, by the computing device 124, an amount of papers added to the paper tray 114 when the second weight is greater than the first weight. In some aspects, the computing device 124 may transmit the amount of papers added or removed from the paper tray 114 to the cloud server 106. Further, the cloud server 106 may update a blank paper usage limit associated with the user, where the blank paper user limit is stored in the database 110 with the authentication records, and where the blank paper usage limit includes a total number of papers the user may remove from the paper trays of any of the plurality of networked printers 102-(1-N).

The first embodiment is illustrated with respect to FIGS. 1-6. The first embodiment describes a paper tray access system 100 for a networked printer 102-1. The paper tray access system 100 includes a locking cover 116 of a paper tray 114, an authentication device 118, a weight sensor 120 located beneath the paper tray 114, a printer display 122, and a computing device 124 including an electrical circuitry 126, a memory 128 storing program instructions and at least one processor 130. The processor 130 is configured to execute the program instructions to receive a user input from the authentication device 118 and determine whether the user input matches an authentication record stored in the memory 128. In examples, when the user input matches the authentication record, the computing device 124 presents a selection on the printer display 122 to access the paper tray 114, receives the selection, and records a first weight of the paper tray 114 upon receiving the selection. The computing device 124 is further configured to unlock the locking cover 116, record a second weight of the paper tray 114, calculate an amount of papers removed from the paper tray 114 when the second weight is less than the first weight, and calculate an amount of papers added to the paper tray 114 when the second weight is greater than the first weight.

The authentication device 118 may be a biometric reader.

The authentication device 118 may be a magnetic card.

The authentication device 118 may be a keypad configured to receive a login code.

The locking cover 116 may be configured with an electronic bolt lock, where the computing device 124 may be configured to generate a drive signal configured to unlock the electronic bolt lock when the user input matches the authentication record.

The paper tray access system 100 further includes a display located on the networked printer 102-1, where the display is configured to show a menu of printer tasks when the user input matches the authentication record, and where the menu includes a selection for paper tray access, and selection of the paper tray unlocks the electronic bolt lock.

The weight sensor 120 is centered on an underside of the paper tray 114 and a wiring harness is operatively connected to the weight sensor 120 and to the computing device 124.

The paper tray access system 100 further includes a blank paper usage limit stored in the memory 128 with the authentication record, where the blank paper usage limit includes a total number of papers a user of a user computer 104-1 may remove from the paper tray 114.

The paper tray access system 100 further includes a user computer 104-1 configured to submit a print job to the networked printer 102-1, a cloud server 106, and a web application 108 operatively connected to the cloud server 106, and a database 110 stored in the cloud server 106, where the database 110 includes a list of authentication records. The web application 108 is configured to monitor paper tray access. Further, the cloud server 106 is configured to communicate with the user computer 104-1 to receive the user input and access the database 110 to match the user input to the authentication record.

The paper tray access system 100 further includes a plurality of networked printers 102-(1-N) configured to access the web application 108, where each networked printer is configured to calculate a number of papers in each paper tray and transmit the number to the database 110. The web application 108 is configured to receive the print job from the user computer 104-1, match the print job to one of the plurality of networked printers 102-(1-N) based on proximity of the each of the plurality of networked printers 102-(1-N) to the user computer 104-1 and the number of papers stored in each paper tray of each of the plurality of networked printers 102-(1-N). The cloud server 106 is configured to provide a networked printer location to the user computer 104-1.

The paper tray access system 100 further includes a blank paper usage limit associated with a user of the user computer 104-1 stored in the database 110 with the authentication records, where the blank paper usage limit includes a total number of papers the user may remove from the paper trays of any of the plurality of networked printers 102-(1-N).

The second embodiment is illustrated with respect to FIGS. 1-6. The second embodiment describes a method 500 for paper tray access of a networked printer 102-1. The method 500 includes prompting, on a display of the networked printer 102-1, a user to enter an authentication input. The method 500 further includes receiving, by a computing device 124 of the networked printer 102-1, the authentication input, and determining, by the computing device 124, whether the authentication input matches an authentication record. When the authentication input matches the authentication record, the method 500 includes, presenting, on the display, a selection to access a paper tray 114. The method 500 includes measuring, by a weight sensor 120 located beneath the paper tray 114, a first weight of the paper tray 114 upon receiving the selection. Also, the method 500 includes recording, by the computing device 124, the first weight, and unlocking, by the computing device 124, a locking cover 116 of the paper tray 114 of the networked printer 102-1. The method 500 further includes measuring, by the weight sensor 120, a second weight of the paper tray 114, and recording, by the computing device 124, the second weight. Further, the method 500 includes calculating, by the computing device 124, an amount of papers removed from the paper tray 114 when the second weight is less than the first weight, and calculating, by the computing device 124, an amount of papers added to the paper tray 114 when the second weight is greater than the first weight.

The method 500 further includes comparing, by the computing device 124, a blank paper usage limit associated with the user to the amount of papers removed from the paper tray 114. When the amount of papers removed from the paper tray 114 exceeds the blank paper usage limit, the method 500 includes locking the locking cover 116, and performing one or more of displaying a warning on the display, transmitting an alert to a user computer 104-1 that the blank paper usage limit has been exceeding, and charging the user for the blank papers which exceed the usage limit.

The method 500 further includes generating, by the computing device 124, a drive signal configured to one of unlock and lock an electronic bolt lock of the locking cover 116 of the paper tray 114 of the networked printer 102-1.

The method 500 further includes receiving, by the computing device 124, the authentication input from a biometric reader.

The method 500 further includes receiving, by the computing device 124, the authentication input from a magnetic card.

The method 500 further includes receiving, by the computing device 124, the authentication input from a login code entered on a keypad of the networked printer 102-1.

The third embodiment is illustrated with respect to FIGS. 1-6. The third embodiment describes a method 600 for monitoring paper tray access of a plurality of networked printers 102-(1-N). The method 600 includes receiving, by a cloud server 106 including a web application 108 for managing the plurality of networked printers 102-(1-N), a request to perform a print job from a user computer 104-1. The method 600 further includes selecting a designated printer from the plurality of networked printers 102-(1-N) by matching the print job to one of the plurality of networked printers 102-(1-N) based on proximity of the each of the plurality of networked printers 102-(1-N) to the user computer 104-1 and a number of papers stored in each paper tray of each of the plurality of networked printers 102-(1-N). The method 600 further includes transmitting an authentication input and a location of the designated printer to the user computer 104-1, prompting, by the designated printer, a user of the user computer 104-1 to enter the authentication input, and receiving, by the cloud server 106, the authentication input from the designated printer. Further, the method 600 includes accessing, by the cloud server 106, a database 110 including a list of authentication records, and determining, by the cloud server 106, whether the authentication input matches one of the authentication records. When the authentication input matches one of the authentication records, the method 600 includes presenting, on a display of the designated printer, a selection to access a paper tray 114, and measuring, by a weight sensor 120 located beneath the paper tray 114 of the designated printer, a first weight of the paper tray 114 upon receiving the selection. The method 600 also includes recording, by a computing device 124 of the designated printer, the first weight, unlocking, by the computing device 124, a locking cover 116 of the paper tray 114 of the designated printer. Also, the method 600 includes measuring, by the weight sensor 120, a second weight of the paper tray 114, recording, by the computing device 124, the second weight, calculating, by the computing device 124, an amount of papers removed from the paper tray 114 when the second weight is less than the first weight, and calculating, by the computing device 124, an amount of papers added to the paper tray 114 when the second weight is greater than the first weight.

The method 600 further includes transmitting, by the computing device 124, the amount of papers added or removed from the paper tray 114 to the cloud server 106, and updating, by the cloud server 106, a blank paper usage limit associated with the user, where the blank paper user limit is stored in the database 110 with the authentication records, and where the blank paper usage limit includes a total number of papers the user may remove from the paper trays of any of the plurality of networked printers 102-(1-N).

The method 600 further includes presenting on the display of the designated printer, a prompt for the user to enter the authentication input at one of a biometric reader, a magnetic card reader, and a keypad.

The method 600 further includes generating, by the computing device 124, a drive signal configured to one of unlock and lock an electronic bolt lock of the locking cover 116 of the paper tray 114.

Figure 7:
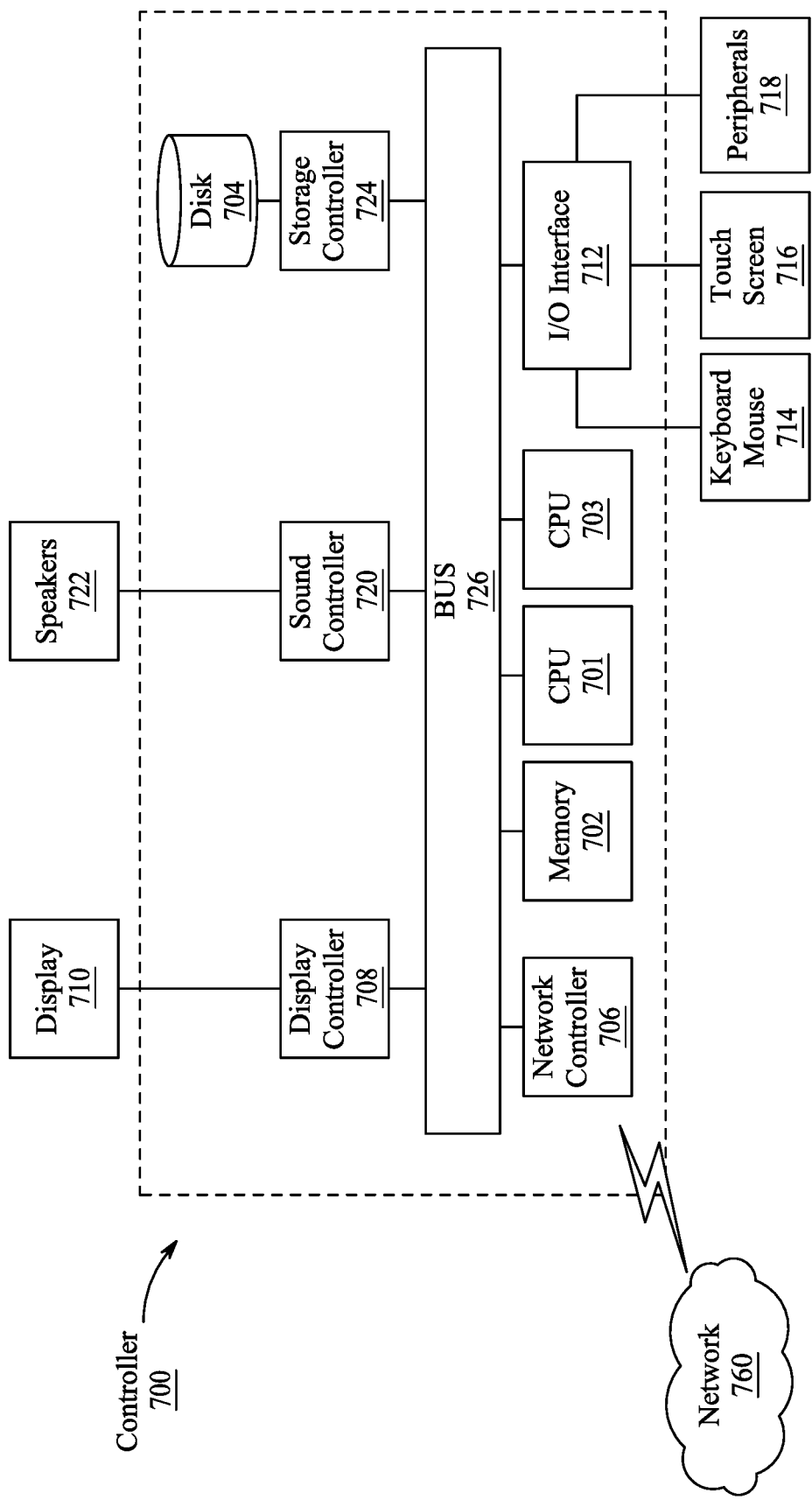
FIG. 7 is an illustration of a non-limiting example of details of computing hardware used in the computing system, according to certain embodiments.

Next, further details of the hardware description of the computing environment according to exemplary embodiments is described with reference to FIG. 7. FIG. 7 is an illustration of a non-limiting example of details of computing hardware used in the computing system, according to exemplary aspects of the present disclosure. In FIG. 7, a controller 700 is described which is a computing device (for example, the computing device 124) and includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music. The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
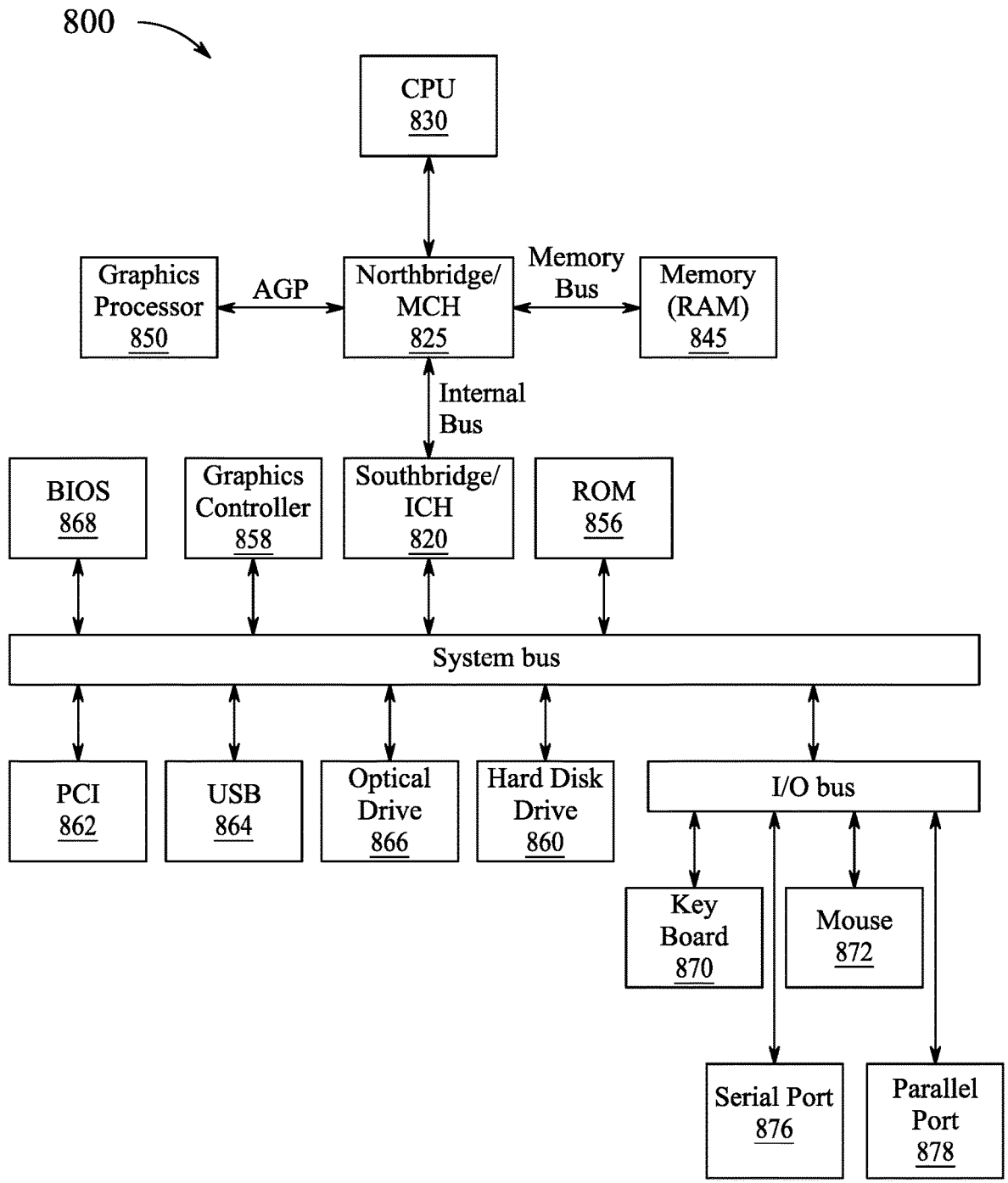
FIG. 8 is an exemplary schematic diagram of a data processing system used within the computing system, according to certain embodiments.

FIG. 8 shows a schematic diagram of a data processing system 800, according to certain embodiments, for performing the functions of the exemplary embodiments. The data processing system 800 is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
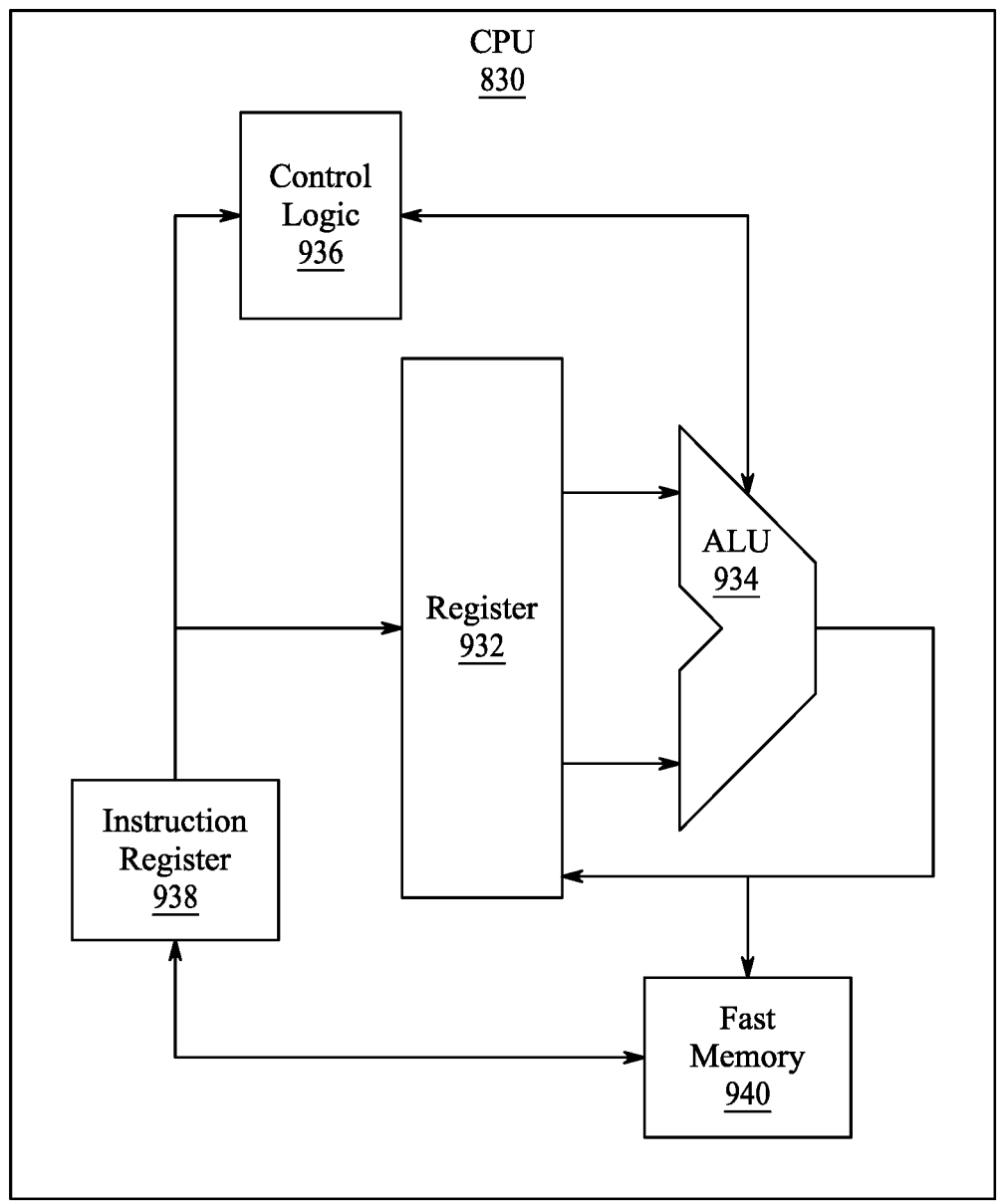
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices may include, for example, Ethernet adapters, add-in cards, and PC cards for notebook computers. The Hard disk drive 860 and CD-ROM 856 can use, for example, an integrated drive electronics (IDE) or serial advanced technology attachment (SATA) interface. In one implementation, the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)).

Figure 10:
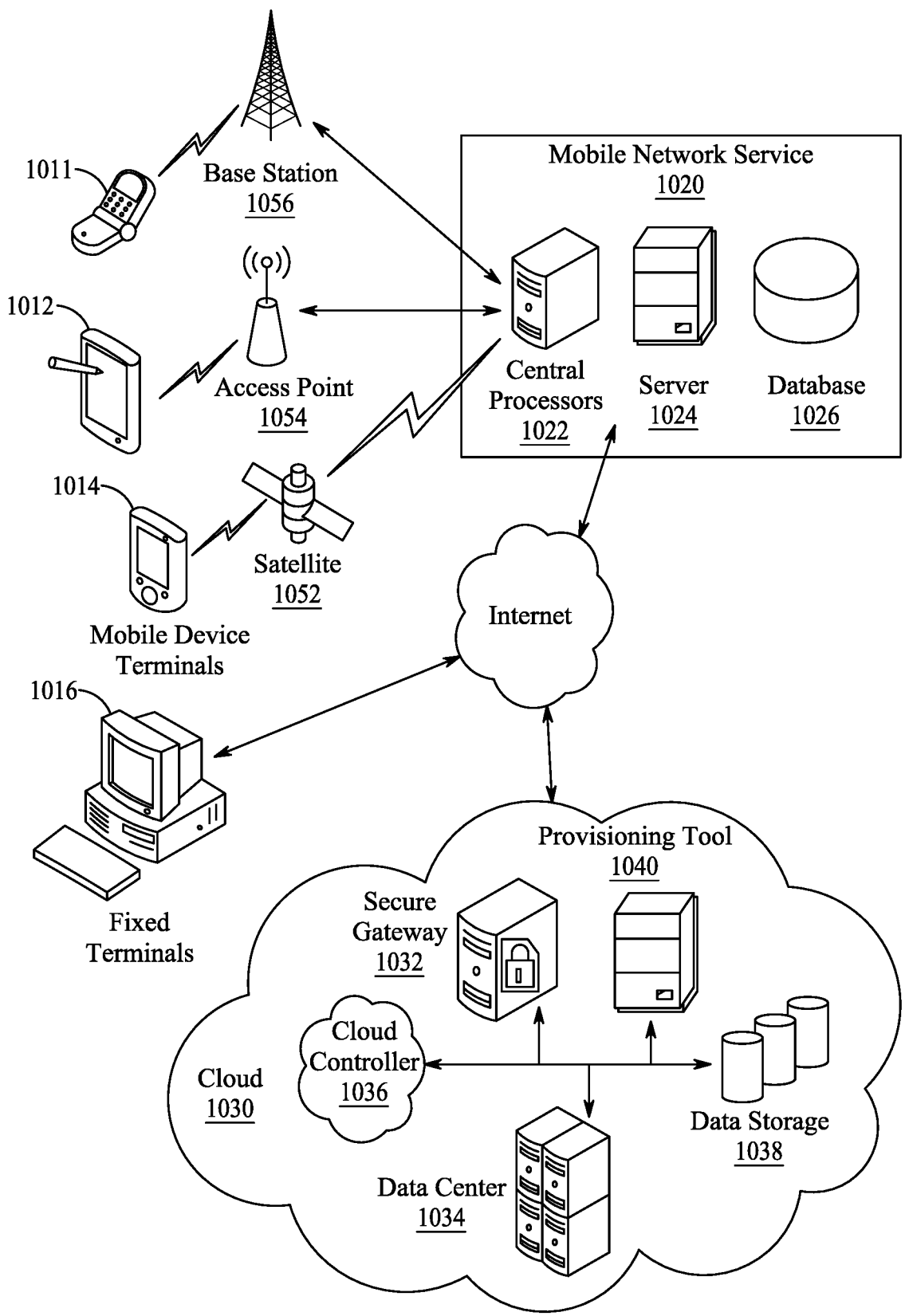
FIG. 10 is an illustration of a non-limiting example of distributed components which may share processing with the controller, according to certain embodiments.

More specifically, FIG. 10 illustrates client devices including a smart phone 1011, a tablet 1012, a mobile device terminal 1014 and fixed terminals 1016. These client devices may be commutatively coupled with a mobile network service 1020 via base station 1056, access point 1054, satellite 1052 or via an internet connection. Mobile network service 1020 may comprise central processors 1022, a server 1024 and a database 1026. Fixed terminals 1016 and mobile network service 1020 may be commutatively coupled via an internet connection to functions in cloud 1030 that may comprise security gateway 1032, data center 1034, cloud controller 1036, data storage 1038 and provisioning tool 1040. The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A paper tray access system for a printer, comprising:
a paper tray located in the printer;
a locking cover of the paper tray;
an authentication device;
a weight sensor located beneath the paper tray;
a printer display;
a computing device including an electrical circuitry, a memory storing program instructions and at least one processor configured to execute the program instructions to:
receive a user input from the authentication device;
determine whether the user input matches an authentication record stored in the memory;
when the user input matches the authentication record, present a selection on the printer display to access the paper tray;
receive the selection;
record a first weight of the paper tray upon receiving the selection;
unlock the locking cover;
record a second weight of the paper tray;
calculate an amount of papers removed from the paper tray when the second weight is less than the first weight; and
calculate an amount of papers added to the paper tray when the second weight is greater than the first weight.

2. The paper tray access system of claim 1, wherein the authentication device is a biometric reader.

3. The paper tray access system of claim 1, wherein the authentication device is a magnetic card reader.

4. The paper tray access system of claim 1, wherein the authentication device is a keypad configured to receive a login code.

5. The paper tray access system of claim 1, wherein the locking cover is configured with an electronic bolt lock, wherein the computing device is configured to generate a drive signal configured to unlock the electronic bolt lock when the user input matches the authentication record.

6. The paper tray access system of claim 5, further comprising:
wherein the printer display is configured to show a menu of printer tasks when the user input matches the authentication record, wherein the menu includes a selection for paper tray access, and selection of the paper tray unlocks the electronic bolt lock.

7. The paper tray access system of claim 1, wherein:
the weight sensor is centered on an underside of the paper tray; and
a wiring harness operatively connected to the weight sensor and to the computing device.

8. The paper tray access system of claim 1, further comprising:
a blank paper usage limit stored in the memory with the authentication record, wherein the blank paper usage limit includes a total number of papers a user of a user computer may remove from the paper tray.

9. The paper tray access system of claim 1, further comprising:
a user computer configured to submit a print job to the printer;
a cloud server;
a web application operatively connected to the cloud server, wherein the web application is configured to monitor paper tray access;
a database stored in the cloud server, wherein the database includes a list of authentication records,
wherein the cloud server is configured to communicate with the user computer to receive the user input and access the database to match the user input to the authentication record.

10. The paper tray access system of claim 9, further comprising:
a plurality of networked printers configured to access the web application, wherein each networked printer is configured to calculate a number of papers in each paper tray and transmit the number to the database;
wherein the web application is configured to receive the print job from the user computer, match the print job to one of the plurality of networked printers based on proximity of the each of the plurality of networked printers to the user computer and the number of papers stored in each paper tray of each of the plurality of networked printers; and wherein the cloud server is configured to provide a networked printer location to the user computer.

11. The paper tray access system of claim 10, further comprising:
a blank paper usage limit associated with a user of the user computer stored in the database with the authentication records, wherein the blank paper usage limit includes a total number of papers the user may remove from the paper trays of any of the plurality of networked printers.

12. A method for paper tray access of a printer, comprising:
prompting, on a display of the printer, a user to enter an authentication input;
receiving, by a computing device of the printer, the authentication input;
determining, by the computing device, whether the authentication input matches an authentication record;
when the authentication input matches the authentication record, presenting, on the display, a selection to access a paper tray;
measuring, by a weight sensor located beneath the paper tray, a first weight of the paper tray upon receiving the selection;
recording, by the computing device, the first weight;
unlocking, by the computing device, a locking cover of the paper tray of the printer;
measuring, by the weight sensor, a second weight of the paper tray;
recording, by the computing device, the second weight;
calculating, by the computing device, an amount of papers removed from the paper tray when the second weight is less than the first weight; and
calculating, by the computing device, an amount of papers added to the paper tray when the second weight is greater than the first weight.

13. The method of claim 12, further comprising:
comparing, by the computing device, a blank paper usage limit associated with of the user to the amount of papers removed from the paper tray;
when the amount of papers removed from the paper tray exceeds the blank paper usage limit, locking the locking cover; and
performing one or more of:
displaying a warning on the display,
transmitting an alert to a user computer that the blank paper usage limit has been exceeded, and
charging the user for the blank papers which exceed the usage limit.

14. The method of claim 12, further comprising:
generating, by the computing device, a drive signal configured to one of unlock and lock an electronic bolt lock of the locking cover of the paper tray of the printer.

15. The method of claim 12, further comprising:
receiving, by the computing device, the authentication input from a biometric reader.

16. The method of claim 12, further comprising:
receiving, by the computing device, the authentication input from a magnetic card.

17. The method of claim 12, further comprising:
receiving, by the computing device, the authentication input from a login code entered on a keypad of the printer.

18. A method for monitoring paper tray access of a plurality of networked printers, comprising:
receiving, by a cloud server including a web application for managing the plurality of networked printers, a request to perform a print job from a user computer;
selecting a designated printer from the plurality of networked printers by matching the print job to one of the plurality of networked printers based on proximity of each of the plurality of networked printers to the user computer and a number of papers stored in each paper tray of each of the plurality of networked printers;
transmitting an authentication input and a location of the designated printer to the user computer;
prompting, by the designated printer, a user of the user computer to enter the authentication input;
receiving, by the cloud server, the authentication input from the designated printer;
accessing, by the cloud server, a database including a list of authentication records;
determining, by the cloud server, whether the authentication input matches one of the authentication records;
when the authentication input matches one of the authentication records,
presenting, on a display of the designated printer, a selection to access a paper tray;
measuring, by a weight sensor located beneath the paper tray of the designated printer, a first weight of the paper tray upon receiving the selection to access the paper tray;
recording, by a computing device of the designated printer, the first weight;
unlocking, by the computing device, a locking cover of the paper tray of the designated printer;
measuring, by the weight sensor, a second weight of the paper tray;
recording, by the computing device, the second weight;
calculating, by the computing device, an amount of papers removed from the paper tray when the second weight is less than the first weight; and
calculating, by the computing device, an amount of papers added to the paper tray when the second weight is greater than the first weight.

19. The method of claim 18, further comprising:
transmitting, by the computing device, the amount of papers added or removed from the paper tray to the cloud server; and
updating, by the cloud server, a blank paper usage limit associated with the user, wherein the blank paper user limit is stored in the database with the authentication records, wherein the blank paper usage limit includes a total number of papers the user may remove from the paper trays of any of the plurality of networked printers.

20. The method of claim 18, further comprising:
presenting on the display of the designated printer, a prompt for the user to enter the authentication input at one of:
a biometric reader;
a magnetic card reader; and
a keypad.

* * * * *

UNITED STATES PATENT AND TRADEMARK OFFICE
CERTIFICATE OF CORRECTION

| | | |
|---|---|---|
| PATENT NO. | : 11,748,588 B1 | Page 1 of 1 |
| APPLICATION NO. | : 18/163047 | |
| DATED | : September 5, 2023 | |
| INVENTOR(S) | : Ghazanfar Latif et al. | |

It is certified that error appears in the above-identified patent and that said Letters Patent is hereby corrected as shown below:

On the Title Page

Item (73), the Assignee's information is incorrect. Item (73) should read:
-- (73) Assignee: Prince Mohammad Bin Fahd University, Dhahran (SA) --

Signed and Sealed this
Twenty-seventh Day of May, 2025

Coke Morgan Stewart
*Acting Director of the United States Patent and Trademark Office*